United States Patent
Foxhall et al.

(10) Patent No.: US 10,800,490 B2
(45) Date of Patent: Oct. 13, 2020

(54) EXHAUST ASSEMBLY, EXHAUST SYSTEM, AND POWER PACK FOR A VEHICLE

(71) Applicant: BRP-ROTAX GMBH & CO. KG, Gunskirchen (AT)

(72) Inventors: Nigel Foxhall, Semriach (AT); Roland Kirchberger, Graz (AT); Stefan Krimplstatter, Graz (AT); Roland Oswald, Ehrenhausen (AT); Franz Winkler, Graz (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 15/878,002

(22) Filed: Jan. 23, 2018

(65) Prior Publication Data

US 2018/0215446 A1    Aug. 2, 2018

Related U.S. Application Data

(60) Provisional application No. 62/450,206, filed on Jan. 25, 2017.

(51) Int. Cl.
*B62M 27/02*    (2006.01)
*F01N 1/02*    (2006.01)
(Continued)

(52) U.S. Cl.
CPC ............ *B62M 27/02* (2013.01); *F01N 1/02* (2013.01); *F01N 13/107* (2013.01); *F02B 37/00* (2013.01);
(Continued)

(58) Field of Classification Search
CPC ... B62M 27/02; B62M 2027/023; F01N 1/02; F01N 13/107; F01N 2260/06; F01N 2590/00; F02B 37/00; F02B 37/02; F02B 2075/025; F02M 26/05; F02M 26/24; F02M 26/41; Y02T 10/144
See application file for complete search history.

(56) References Cited

U.S. PATENT DOCUMENTS 3,703,937 A    11/1972    Tenney
3,726,084 A    4/1973    Meier et al.
(Continued)

FOREIGN PATENT DOCUMENTS

CH    509508 A    6/1971
EP    0401196 A2    12/1990
(Continued)

OTHER PUBLICATIONS

Machine Translation of EP-2196641-A1 (Year: 2010).*
(Continued)

*Primary Examiner* — Brandon D Lee
(74) *Attorney, Agent, or Firm* — BCF LLP

(57) ABSTRACT

An exhaust assembly for a vehicle is disclosed, which includes a resonator including an inlet adapted for fluidly connecting to an exhaust manifold, and a closed end at an end of the resonator opposite the inlet; and a turbocharger passage extending from the resonator between the exhaust manifold and the closed end, the turbocharger passage defining an outlet. An exhaust system, a power pack, and the vehicle including the exhaust assembly are further disclosed.

16 Claims, 8 Drawing Sheets

(51) Int. Cl.
*F02B 37/00* (2006.01)
*F02M 26/05* (2016.01)
*F02M 26/24* (2016.01)
*F02M 26/41* (2016.01)
*F01N 13/10* (2010.01)
*F02B 37/02* (2006.01)
*F02B 75/02* (2006.01)

(52) U.S. Cl.
CPC ............. *F02B 37/02* (2013.01); *F02M 26/05* (2016.02); *F02M 26/24* (2016.02); *F02M 26/41* (2016.02); *B62M 2027/023* (2013.01); *F01N 2260/06* (2013.01); *F01N 2590/00* (2013.01); *F02B 2075/025* (2013.01); *Y02T 10/144* (2013.01)

(56) References Cited

U.S. PATENT DOCUMENTS

| | | | |
|---|---|---|---|
| 6,698,194 | B2 | 3/2004 | Blair et al. |
| 9,121,330 | B2 | 9/2015 | Straub |
| 2016/0109045 | A1* | 4/2016 | Jang ............... F01N 3/28 285/189 |
| 2019/0120130 | A1* | 4/2019 | Kuroiwa ............ F02B 39/005 |

FOREIGN PATENT DOCUMENTS

| | | | | |
|---|---|---|---|---|
| EP | 0554875 | A1 | 8/1993 | |
| EP | 2196641 | A1 * | 6/2010 | ............. F01N 1/026 |
| EP | 2196641 | A1 | 6/2010 | |
| JP | S59176419 | A | 10/1984 | |
| JP | 60142009 | A * | 7/1985 | ............. F02B 27/04 |
| WO | 2009114414 | A1 | 9/2009 | |
| WO | 2010105620 | A1 | 9/2010 | |
| WO | 2014158047 | A1 | 10/2014 | |
| WO | 2016193902 | A2 | 12/2016 | |

OTHER PUBLICATIONS

English Abstract of EP0554875A1 retrieved from https://worldwide.espacenet.com/ on Apr. 19, 2018.
English Abstract of EP0401196A2 retrieved from https://worldwide.espacenet.com/ on Apr. 19, 2018.
English Abstract of WO2014158047A1 retrieved from https://worldwide.espacenet.com/ on Apr. 19, 2018.
English Abstract of EP2196641A1 retrieved from https://worldwide.espacenet.com/ on Apr. 19, 2018.
English Abstract of JPS59176419A retrieved from https://worldwide.espacenet.com/ on Apr. 19, 2018.
English Machine Translation of CH509508A retrieved from http://translationportal.epo.org/ on Apr. 20, 2018.

* cited by examiner

EXHAUST ASSEMBLY, EXHAUST SYSTEM, AND POWER PACK FOR A VEHICLE

CROSS-REFERENCE

The present application claims priority to U.S. Provisional Patent Application No. 62/450,206, filed Jan. 25, 2017, entitled "Exhaust Assembly, Exhaust System, And Power Pack For A Vehicle", the entirety of which is incorporated herein by reference.

TECHNICAL FIELD

The present technology relates to a two-stroke engine based power pack for a vehicle, as well as an exhaust system and an exhaust assembly for use with a two-stroke engine.

BACKGROUND

Vehicles such as snowmobiles often use power packs with two-stroke internal combustion engines and associated exhaust systems. While generally lighter and more powerful than a similar four-stroke engine, two-stroke engines may present some drawbacks.

Some common drawbacks are due to the cycle of two-stroke engines, where each time new air and fuel are loaded into the combustion chambers of a two-stroke engine, a portion of the air and fuel may leak out of the engine through the exhaust port(s) before combustion can occur. This contributes to pollution created by the vehicle, as well as reducing the overall fuel efficiency.

Although the above drawbacks may be resolved by switching to a four-stroke engine, doing so would result in losing the advantages typically associated with two-stroke engine, namely a simplified construction, more power (two-stroke engines have a combustion in each combustion chamber at every revolution, four-stoke engines at every two revolutions), and a lighter weight. These advantages of two-stroke engines are important features for vehicles such as motorcycles, snowmobiles and other recreational vehicles.

Another potential tool for improving engine efficiency is the addition of a turbocharger, which uses energy from exhaust gases exiting the engine to provide higher pressure air input into combustion chambers of the engine, allowing for combustion of more fuel each cycle. This can be problematic for two-stroke engines, however, as the turbocharger does not recapture the fresh air and fuel leaking out the exhaust ports each cycle. Further, the additional air and fuel entering the combustion chambers may mean more air and fuel leaking out of the engine before combustion can occur.

Tuned expansion chambers, also known as tuning pipes, are often used for combating the air and fuel leakage problem of two-stroke engines. The tuned expansion chamber is connected between the engine exhaust ports and the muffler. As exhaust gases move through the chamber, a portion is reflected back to create a pressure wave pushing back against the exhaust ports. This pressure wave pushes fresh air and fuel back toward the combustion chambers, thereby at least partially resolving the air and fuel leakage problem.

In order to both increase efficiency and combat the air and fuel leakage problem of two-stroke engines, one may contemplate implementing both the tuned expansion chamber and the turbocharger. Unfortunately, both solutions utilize exhaust gases from the engine to work. The expansion chamber and the turbocharger could potentially be installed in series, the expansion chamber connected to the exhaust ports and the turbocharger connected to the expansion chamber. This is not optimal, however, as a portion of the exhaust gases would be reflected back toward the engine in the pressure wave created by the expansion chamber, reducing the energy from the exhaust gases available to the turbocharger. Further, the portion of the exhaust gases passing through the expansion chamber will cool and become less energetic in the distance between the exhaust ports and the turbocharger, once again reducing the capacity of the turbocharger to improve engine efficiency. It should also be noted that the opposite configuration, where the turbocharger is connected between the engine and the expansion chamber will prevent any benefit to be gleaned from the expansion chamber, as the exhaust gases would be routed through a turbine and prevent a pressure wave from propagating back toward the engine).

There is therefore a desire for a power pack including a two-stroke engine and an associated exhaust system which addresses the above described drawbacks.

SUMMARY

It is an object of the present technology to ameliorate at least some of the inconveniences present in the prior art.

According to one broad aspect of the present technology, there is provided an exhaust assembly, comprising a resonator including an inlet adapted for fluidly connecting to an exhaust manifold, and a closed end at an end of the resonator opposite the inlet; and a turbocharger passage extending from the resonator between the exhaust manifold and the closed end, the turbocharger passage defining an outlet.

In some implementations, the turbocharger passage is disposed nearer to the inlet than to the closed end.

In some implementations, the turbocharger passage is disposed at less than a third of a length of the resonator from the inlet, the length of the resonator being measured along a center line of the resonator from the inlet to the closed end.

In some implementations, an outlet axis through a center of the outlet and normal to the outlet is disposed at an angle to an inlet axis through a center of the inlet and normal to the inlet.

In some implementations, the angle between the outlet axis and the inlet axis, as measured from a center of the outlet to a center of the inlet, is greater than 90 degrees.

In some implementations, the inlet and the outlet face at least partially in opposite directions.

In some implementations, the resonator is bent in a U-shape such that a central portion of the resonator is farther from the inlet than the closed end is from the inlet.

In some implementations, a central portion of the resonator has a larger diameter than either of the closed end and the inlet.

In some implementations, a diameter of the resonator increases as the resonator extends from the inlet toward a central portion of the resonator; and the diameter of the resonator decreases as the resonator extends from the central portion toward the closed end.

In some implementations, the exhaust assembly further comprises a flange about the outlet adapted for receiving a turbocharger disposed on the turbocharger passage.

According to another broad aspect of the present technology, there is provided an exhaust system, comprising an exhaust manifold adapted for connecting to an engine; an exhaust assembly operatively connected to the exhaust manifold, the exhaust assembly including a resonator including an inlet connected to the exhaust manifold, and a closed end at an end of the resonator opposite the inlet; and a turbocharger passage extending from the resonator between the exhaust manifold and the closed end, the turbocharger passage defining an outlet; a turbocharger operatively connected to the turbocharger passage and fluidly connected to the outlet; and a muffler fluidly connected to the turbocharger.

In some implementations, the turbocharger passage is disposed nearer to the inlet than to the closed end.

In some implementations, the turbocharger passage is disposed at less than a third of a length of the resonator from the inlet, the length of the resonator being measured along a center line of the resonator from the inlet to the closed end.

In some implementations, the resonator is bent in a U-shape such that a central portion of the resonator is farther from the inlet than the closed end is from the inlet.

In some implementations, a central portion of the resonator has a larger diameter than either of the closed end and the inlet.

In some implementations, an outlet axis through a center of the outlet and normal to the outlet is disposed at an angle to an inlet axis through a center of the inlet and normal to the inlet.

In some implementations, the inlet and the outlet face at least partially in opposite directions.

According to yet another broad aspect of the present technology, there is provided a power pack comprising an engine; and an exhaust system operatively connected to the engine, the exhaust system comprising an exhaust manifold connected to the engine; an exhaust assembly operatively connected to the exhaust manifold, the exhaust assembly including a resonator including an inlet connected to the exhaust manifold, and a closed end at an end of the resonator opposite the inlet; and a turbocharger passage extending from the resonator between the exhaust manifold and the closed end, the turbocharger passage defining an outlet; a turbocharger operatively connected to the turbocharger passage and fluidly connected to the outlet; and a muffler fluidly connected to the turbocharger.

According to yet another broad aspect of the present technology, there is provided a vehicle comprising a frame; at least one ground engaging member operatively connected to the frame; the power pack as described above, the engine being connected to the frame and being operatively connected to the at least one ground engaging member; and at least one seat connected to the frame.

In some implementations, the resonator extends forward, to one of leftward and rightward, and then rearward from the manifold; the turbocharger passage extends upward and forward from a rear portion of the resonator; at least a portion of the turbocharger extends one of rightward and leftward of the turbocharger passage; and the muffler is disposed at an other one of rightward and leftward of the turbocharger passage.

For purposes of this application, terms related to spatial orientation such as forwardly, rearward, upwardly, downwardly, left, and right, are as they would normally be understood by an operator of the vehicle riding thereon in a normal driving position. Terms related to spatial orientation when describing or referring to components or sub-assemblies of the vehicle, separately from the vehicle, should be understood as they would be understood when these components or sub-assemblies are mounted to the vehicle, unless specified otherwise in this application.

Explanations and/or definitions of terms provided in the present application take precedence over explanations and/or definitions of these terms that may be found in the document incorporated herein by reference.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative objects, features, and advantages of the implementations of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION

Although the present technology is described below with respect to a snowmobile, it is contemplated that aspects thereof could be applied to other vehicles having two-stroke engines, including, but not limited to: side-by-side vehicles (SSVs), all-terrain vehicles (ATVs), and on-road vehicles such as motorcycles.

Figure 1:
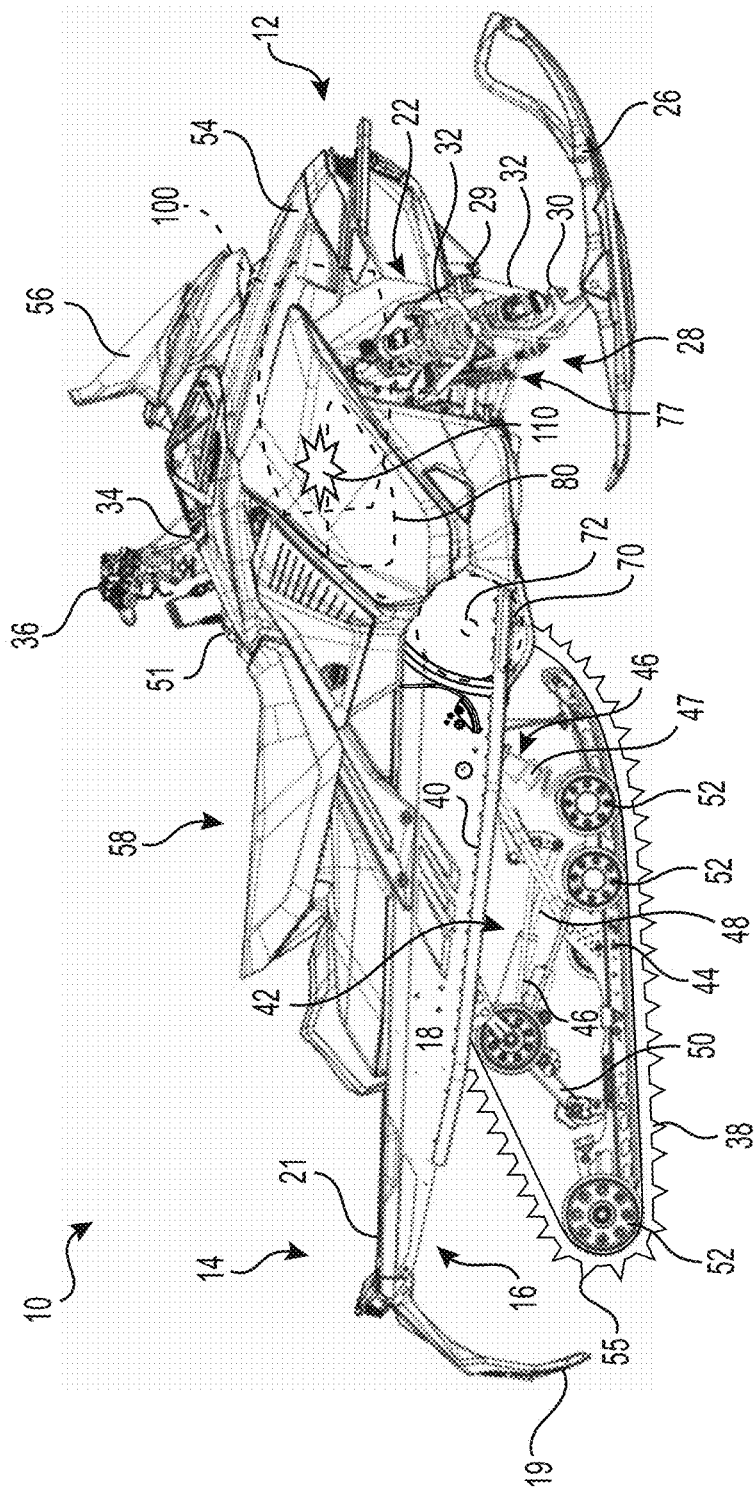
FIG. 1 is a right side elevation view of a snowmobile.

Turning now to FIG. 1, a snowmobile 10 includes a forward end 12 and a rearward end 14 that are defined consistently with a forward travel direction of the snowmobile 10. The snowmobile 10 includes a frame 16 that includes a tunnel 18 and a front suspension assembly portion 22. A power pack 100 is disposed in a forward portion of the snowmobile 10. The power pack 100 includes an engine 110, which in the present implementation is a two-stroke internal combustion engine 110, connected to the frame 16. Two skis 26 are positioned at the forward end 12 of the snowmobile 10 and are attached to the front suspension assembly portion 22 of the frame 16 through front suspension assemblies 28. Each front suspension assembly 28 includes a shock absorber assembly 29, a ski leg 30 and supporting arms 32. Ball joints and steering rods 77 operatively connect the skis 26 to a steering column 34. A steering device in the form of handlebar 36 is attached to the upper end of the steering column 34 to allow a driver to rotate the ski legs 30 and thus the skis 26, in order to steer the snowmobile 10.

A ground engaging member 38 in the form of an endless drive track 38 is disposed generally under the tunnel 18 and is operatively connected to the engine 110 through a continuously variable transmission (CVT) system (not shown).

The endless drive track 38 is driven to run about a rear suspension assembly 42 for propulsion of the snowmobile 10. The endless drive track 38 has a plurality of lugs 55 extending from an outer surface thereof to provide traction to the track 38.

The rear suspension assembly 42 includes a pair of drive sprockets 70 (shown schematically) mounted on a drive axle 72 (shown schematically) for driving the endless drive track 38. The rear suspension assembly 42 includes a pair of slide rails 44 in sliding contact with the endless drive track 38. The rear suspension assembly 42 also includes a plurality of shock absorbers 46 which may further include coil springs 47 surrounding the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the power pack 100 and the CVT, thereby providing an external shell that protects the power pack 100 and the CVT. The fairings 54 include a hood and one or more side panels that can be opened to allow access to the power pack 100 and the CVT when this is required, for example, for inspection or maintenance of the engine 110 and/or the CVT. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward.

A straddle-type seat 58 is positioned over the tunnel 18, atop a fuel tank (not shown). The seat 58 is adapted to accommodate a driver of the snowmobile 10 but it is contemplated that the seat 58 could also be configured to accommodate a passenger as well. A fuel tank fill opening covered by a cap 51 is disposed on the upper surface of the fuel tank in front of the seat 58. Two footrests 40 are positioned on opposite sides of the snowmobile 10 below the seat 58 to accommodate the driver's feet.

The tunnel 18 consists of one or more pieces of sheet metal arranged to form an inverted U-shape that is connected at the front to the engine cradle portion 20 and extends rearward therefrom. A snow flap 19 is disposed at the rear end 14 of the snowmobile 10. The snow flap 19 protects against dirt that can be projected upward from the drive track 38 when the snowmobile 10 is being driven. It is contemplated that the snow flap 19 could be omitted.

The snowmobile 10 has other features and components which would be readily recognized by one of ordinary skill in the art. Further explanation and description of these components will not be provided herein.

The power pack 100 for the snowmobile 10 according to the present technology will now be described with reference to FIGS. 2 to 5. The power pack 100 includes the two-stroke engine 110 which provides power to the snowmobile 10, an exhaust manifold 180, an exhaust assembly 200, a turbocharger 160 and a muffler 190. Together, the exhaust manifold 180, the exhaust assembly 200, the turbocharger 160 and the muffler 190 make up part of an exhaust system 150 for connecting to the two-stroke engine 110.

Figure 3:
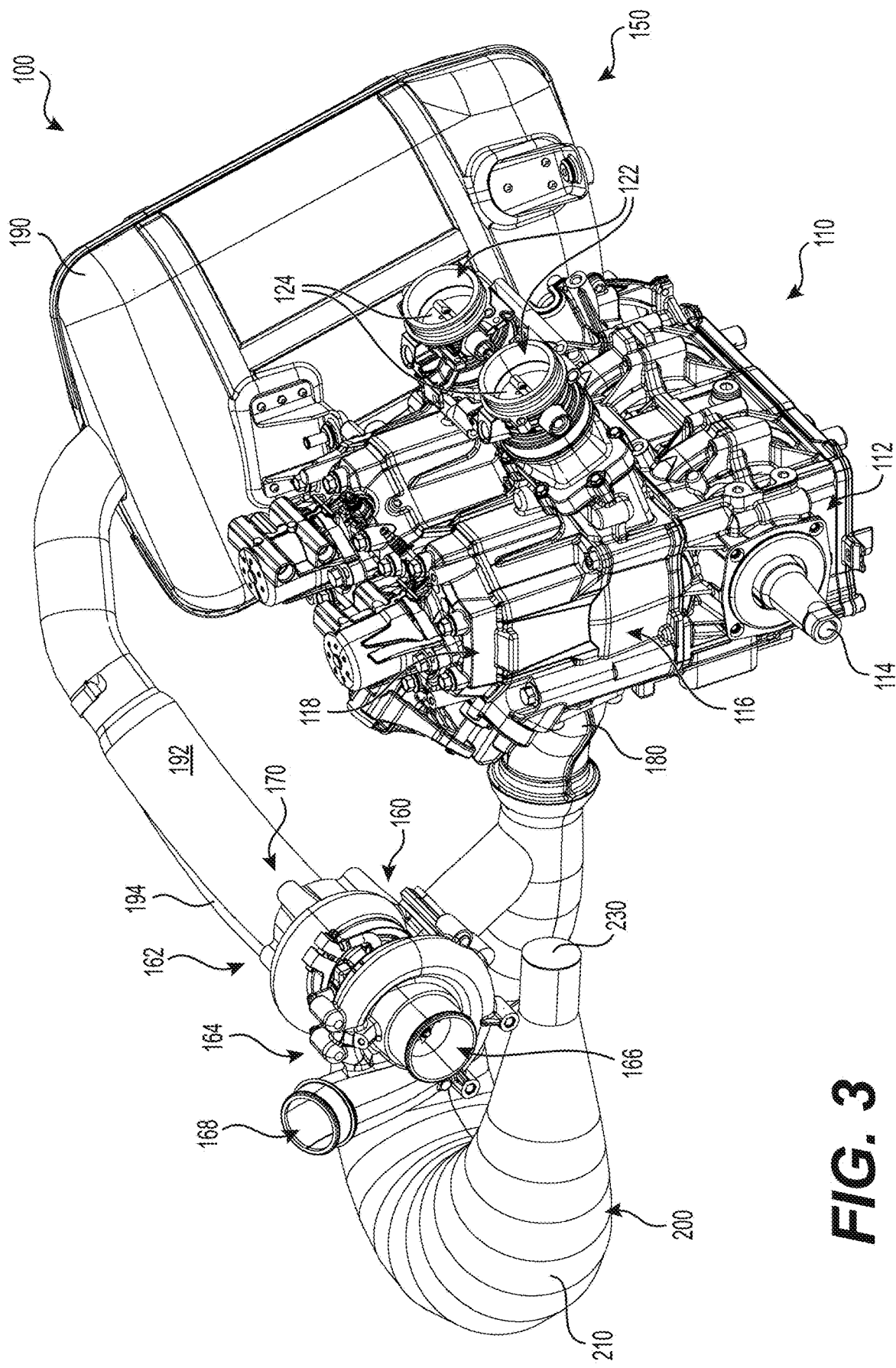
FIG. 3 is a rear, left side perspective view of the power pack of FIG. 2.

The engine 110 has a crankcase 112 housing a portion of a crankshaft 114. As can be seen in FIG. 3, the crankshaft 114 protrudes from the crankcase 112. It is contemplated that the crankshaft 114 could drive an output shaft connected directly to the end of the crankshaft 114 or offset from the crankshaft 114 and driven by driving means such as gears in order to drive a drive pulley of the CVT. It is also contemplated that the crankshaft 114 could drive, using gears for example, a counterbalance shaft housed in part in the crankcase 112 and that the drive pulley could be connected to the counterbalance shaft, in which case, the crankshaft 114 would not have to protrude from the crankcase 112 for this purpose.

A cylinder block 116 is disposed on top of and connected to the crankcase 112. The cylinder block 116 defines two cylinders (not shown), each containing a piston (not shown). A cylinder head 118 is disposed on top of and is connected to the cylinder block 116. Rotation of the crankshaft 114 causes the pistons to reciprocate inside their respective cylinders in the manner generally known in the art for a two-stroke engine. Further details relating to two-stroke engines can be found at least in International Publication WO 2016/193902 A2, published Dec. 8, 2016, the entirety of which is incorporated herein by reference.

Air is supplied to the crankcase 112 via a pair of air intake ports (not shown) formed in the back of the cylinder block 116. It is contemplated that the air intake ports could be formed in the crankcase 112. It is also contemplated that there could be more than one air intake port per cylinder. A pair of throttle bodies 122 is connected to the pair of air intake ports. Each throttle body 122 has a throttle plate 124 that can be rotated to control the air flow to the engine 110. Although not illustrated in the Figures, the throttle plates 124 could be controlled by one or more throttle cables connected to a throttle lever or a throttle motor could be used to change the position of the throttle plates 124. It is also contemplated that each throttle plate 124 could be actuated by its own throttle motor.

Figure 2:
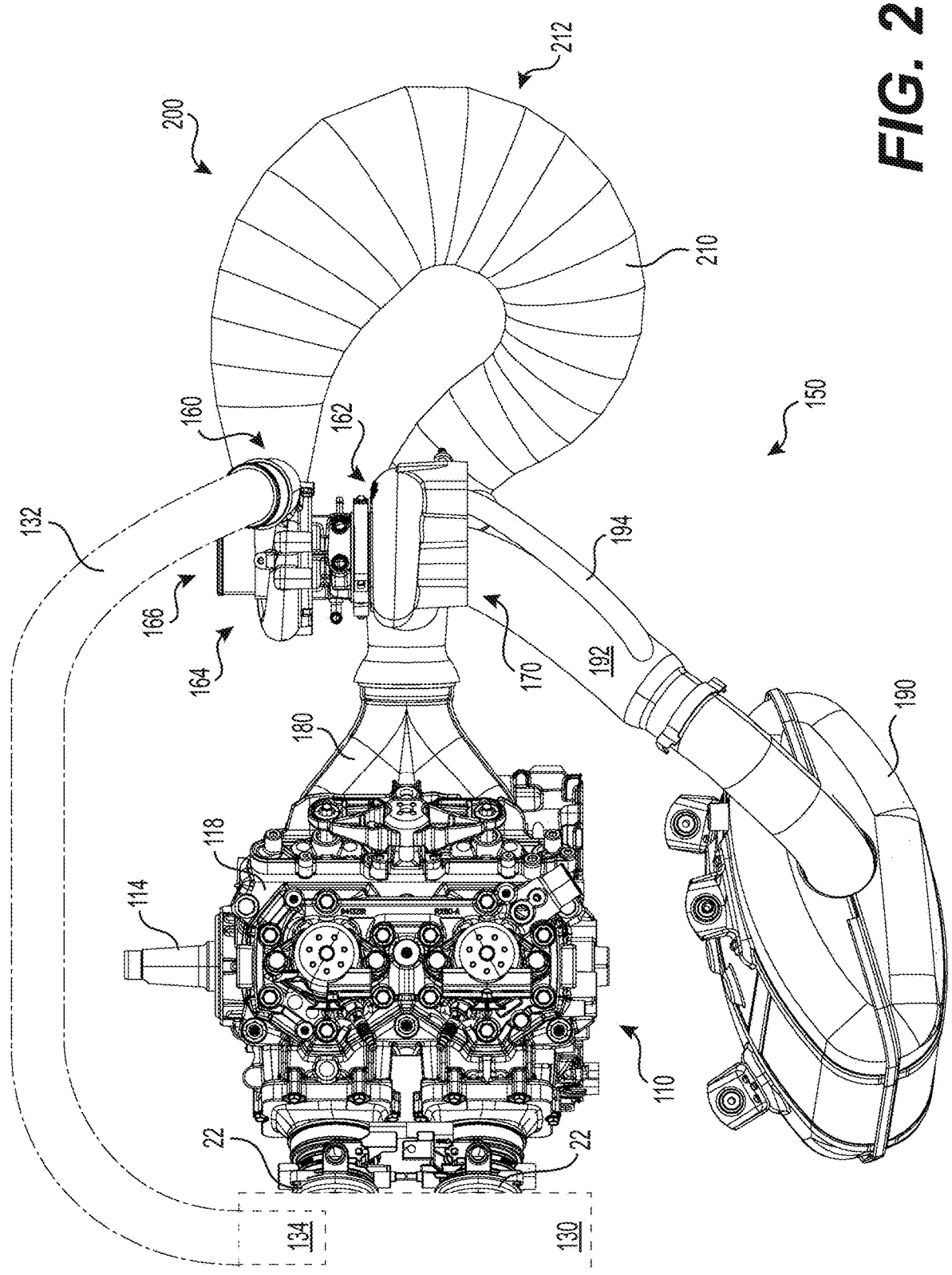
FIG. 2 is a top plan view of a power pack of the snowmobile of FIG. 1.
Figure 5:
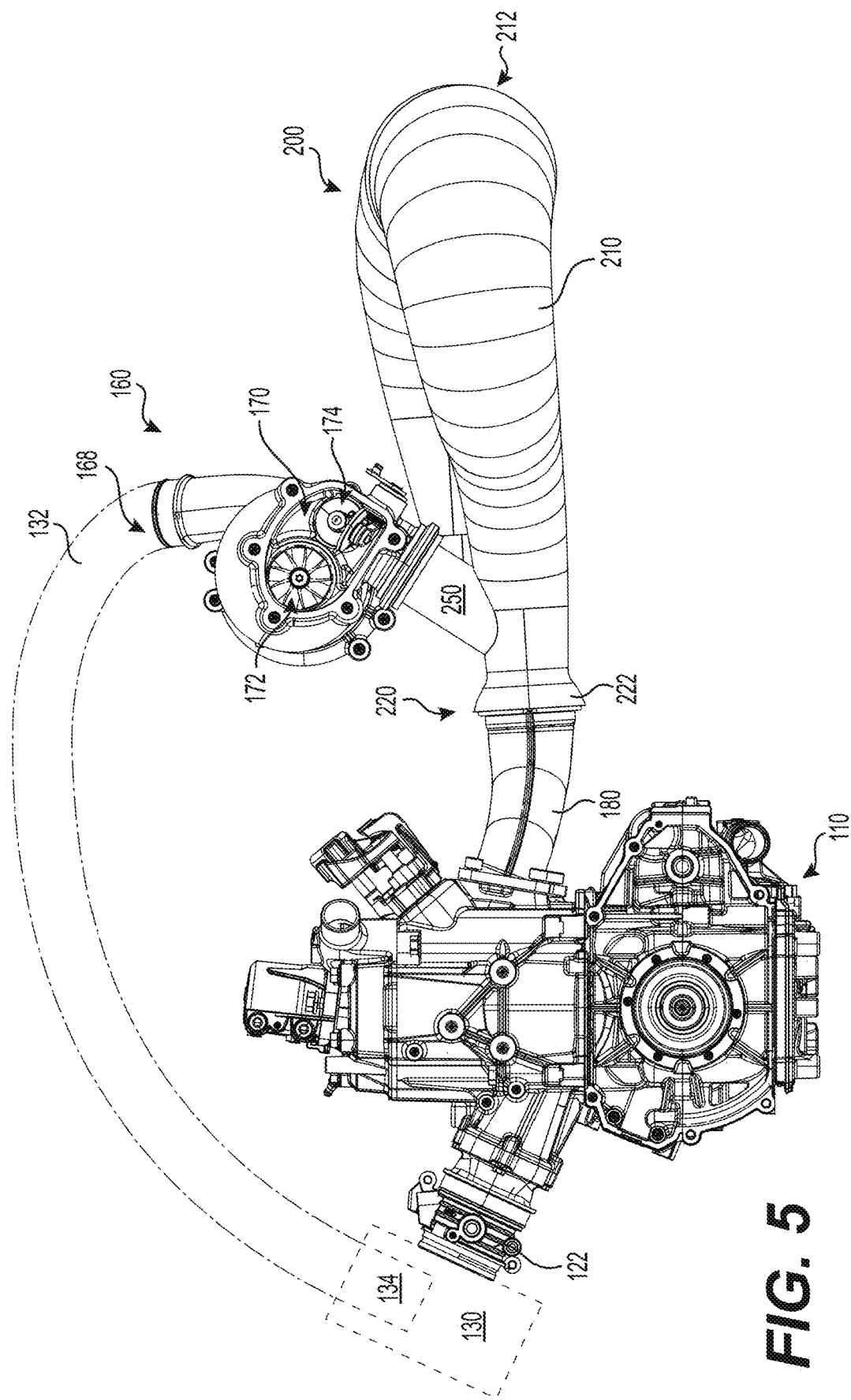
FIG. 5 is a right side elevation view of the power pack of FIG. 2, with a muffler and its connecting pipes removed.

Air is supplied to the throttle bodies 122 by a plenum 130 connected thereto, shown schematically in FIGS. 2 and 5. Compressed intake air is delivered from the turbocharger 160 to the plenum 130 by a pipe 132 extending from an outlet 168 of the turbocharger 160. Exhaust gases enter into and pass through a turbine side 162 of the turbocharger 160 to drive a turbine 172 (see FIG. 5). The turbine 172 in turn drives compression of intake air brought in through an air intake 166 on a compression side 164 of the turbocharger 160. The compressed intake air from the compression side 164 of the turbocharger 160 is then sent out through the pipe 132 to the plenum 130. The plenum 130 includes an intercooler 134 (shown schematically in FIGS. 2 and 5) to cool the compressed intake air. It is contemplated that the intercooler 134 could be included in the pipe 132. It is also contemplated that the intercooler 134 could be disposed between the pipe 132 and the plenum 130. It is further contemplated that some implementations may not include the intercooler 134.

The turbocharger 160 thus delivers air at an increased pressure to the plenum 130 as mentioned above, increasing the air pressure entering the engine 110. This generally improves combustion efficiency of the two-stroke engine 110. Specifics related to delivery of the exhaust gases from the engine 110 to the turbocharger 160 are described in more detail below.

As the pistons reciprocate, air from the crankcase 112 flows into combustion chambers, where combustion of the fuel takes place in accordance with known mechanisms of two-stroke engines. To evacuate the exhaust gases resulting from the combustion of the fuel-air mixture in the combustion chambers, each cylinder defines one main exhaust port and two auxiliary exhaust ports (not shown). It is contemplated that each cylinder could have only one, two or more than three exhaust ports. The exhaust ports connect, directly or indirectly, to an exhaust manifold 180. The exhaust manifold 180 is connected to the front of the cylinder block 104.

Figure 6:
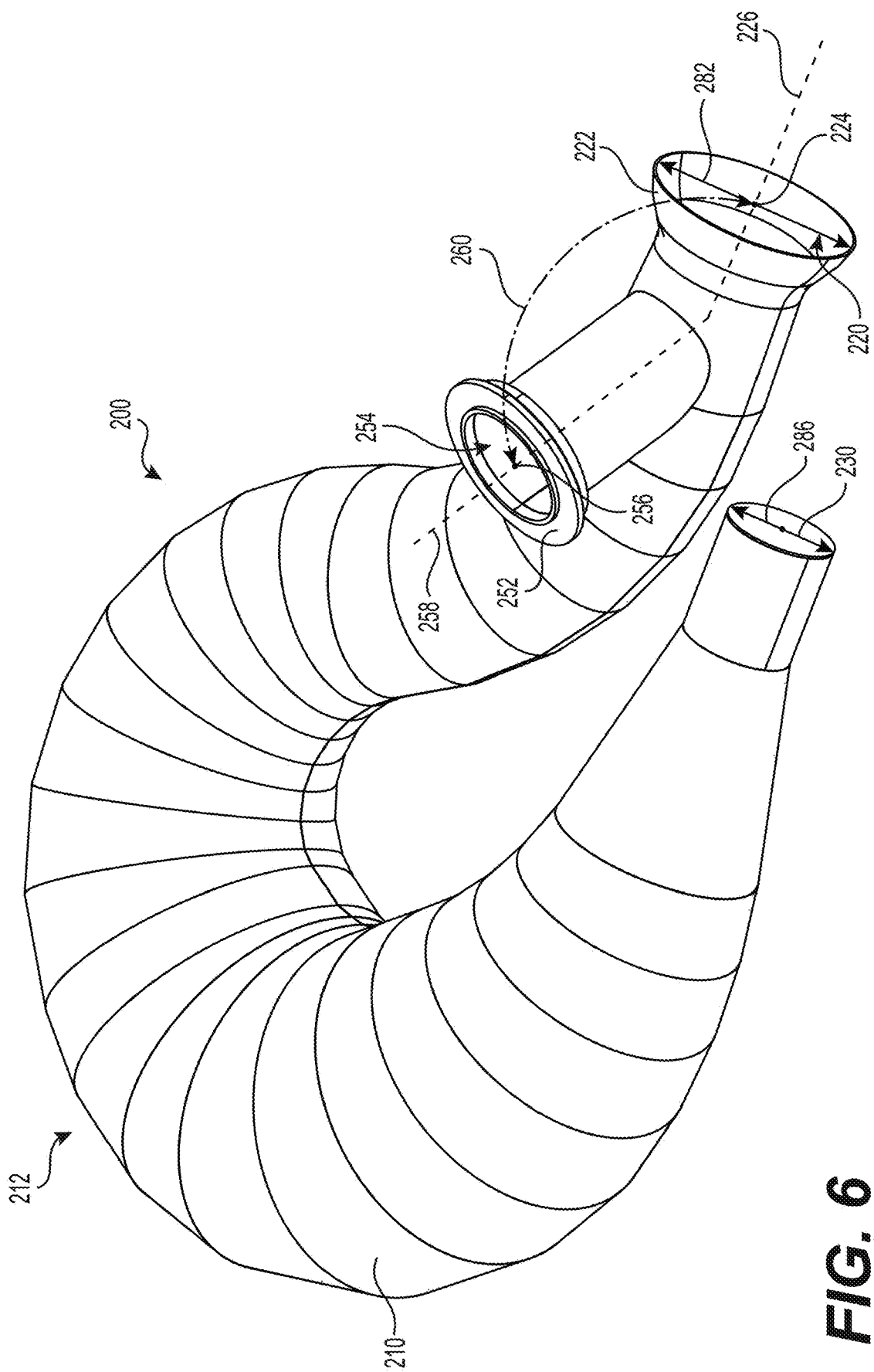
FIG. 6 is a top, rear, left side perspective view of an exhaust assembly of the power pack of FIG. 2.
Figure 7:
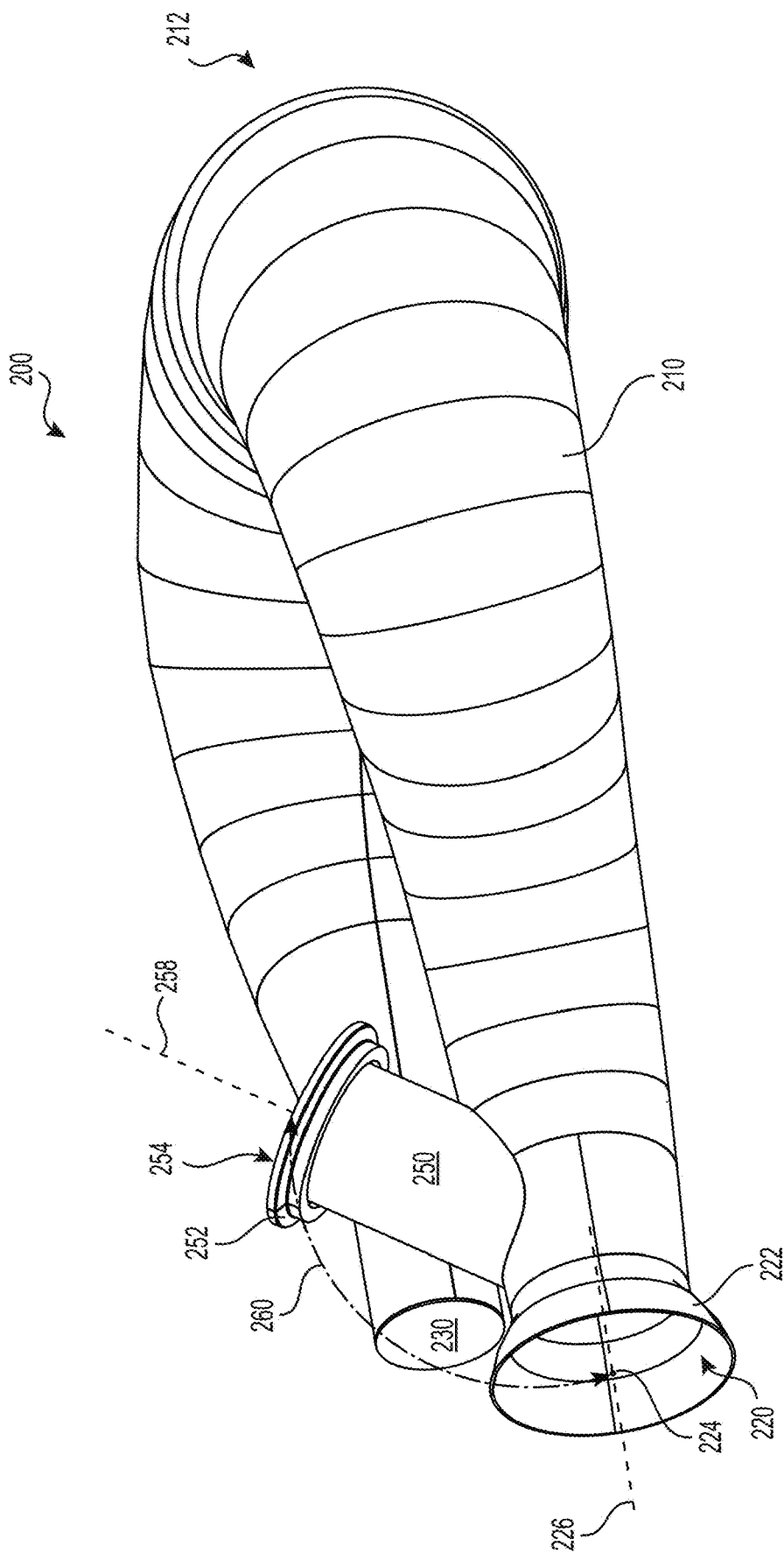
FIG. 7 is a rear, right side perspective view of the exhaust assembly of FIG. 6.
Figure 8:
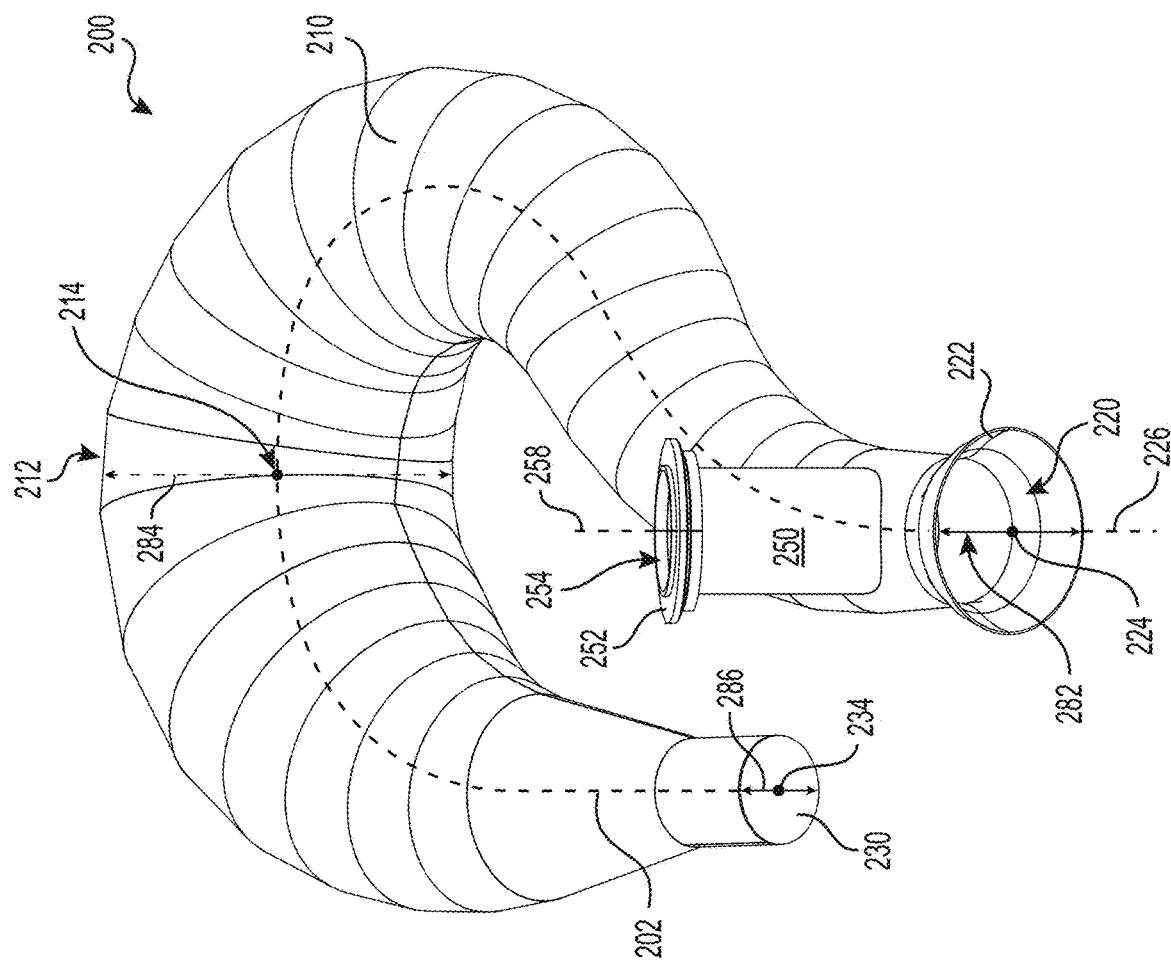
FIG. 8 is a top, rear side perspective view of the exhaust assembly of FIG. 6.

The power pack 100 includes the exhaust assembly 200, illustrated in isolation in FIGS. 6 to 8. The exhaust assembly 200 is connected to a front end of the exhaust manifold 180. The exhaust assembly 200 is a stainless steel hollow body disposed between the engine 110 and the turbocharger 160 for conducting exhaust gases therebetween. It is contemplated that the exhaust assembly 200 could be composed of different materials, including but not limited to: carbon fiber and any appropriate metal or alloy. It is also contemplated that the exhaust assembly 200 could be composed of several parts, of same or different materials, joined together by different methods including, but not limited to, welding and fastening. It is further contemplated that the exhaust assembly 200 could be several parts removably connected together, such that different components of the exhaust assembly 200 could be removed or replaced as need be. It is further contemplated that the exhaust assembly 200 could include further features depending on the implementation, including but not limited to: sensors, structural reinforcements, and fasteners for connecting the exhaust assembly 200 to adjoining elements.

The exhaust assembly 200 includes an inlet 220 which receives exhaust gases from the exhaust manifold 180 when the engine 110 is operating. The inlet 220 includes a flange 222 in the exhaust assembly 200 to aid in sealingly connecting the exhaust assembly 200 to the exhaust manifold 180. It is contemplated that the exhaust manifold 180 could include a flange for sealing around the exhaust assembly 200 in some implementations. It is also contemplated that the exhaust assembly 200 and the exhaust manifold 180 could be welded together.

Extending forward from the inlet 220 of the exhaust assembly 200 is a resonator 210. The resonator 210 is fluidly connected to the inlet 220 and terminates in a closed end 230. The resonator 210 extends forward away from the exhaust manifold 180, slightly rightward, wraps around leftward and then backward toward the manifold 180 and the engine 110. As such, the resonator 210 forms a U-shape, allowing the exhaust assembly 200 to be accommodated in an engine compartment of the snowmobile 10. In the U-shape, a central portion 212 of the resonator 210 is farther from the inlet 220 than the closed end 230 is from the inlet 220, as can be seen in the Figures. It is contemplated that the resonator 210 could be formed in a mirror image of the form illustrated in the Figures, specifically extending forward, slightly leftward, wrapping around rightward and then backward toward the manifold 180 and the engine 110. It is also contemplated that the resonator 210 could be differently bent and shaped, depending on the implementation. It is further contemplated that the resonator 210 could be straight, depending on the implementation of the snowmobile 10.

The central portion 212 of the resonator 210 is larger than the inlet 220 and the closed end 230. This can be seen through further inspection of diameters of the resonator 210, as measured normal to a center line 202 running through a center of the resonator 210. In FIG. 8, three example diameters are illustrated at three points along the center line 202: at the inlet 220, at the closed end 230, and in the central portion 212. As can be seen in the FIG. 8, the central portion 212 of the resonator 210 has a larger diameter 284 than either of a diameter 286 of the closed end 230 and a diameter 282 of the inlet 220. Generally, the diameter of the resonator 210 increases as the resonator 210 extends from the inlet 220 toward the central portion 212 of the resonator. The diameter then decreases as the resonator 210 extends from the central portion 212 toward the closed end 230. The diameter of the resonator 210 increases in small linear increments, but it is contemplated that the diameter could vary smoothly along all or a portion of the length of the resonator 210.

The resonator 210, with its width varying as described above, allows the resonator 210 to provide an effect similar to an expansion chamber, which is sometimes included between a two-stroke engine and its corresponding muffler. When the engine 110 is operating, exhaust gases entering the resonator 210 will cause a pressure wave to reflect back cyclically to the exhaust manifold 180. This pressure wave helps prevent the escape of freshly injected fuel, instead keeping the fuel and air in the engine 110 to be combusted.

The exhaust assembly 200 further includes a turbocharger passage 250, extending upward and forward from the resonator 210. The turbocharger passage 250 defines an outlet 254 through which exhaust gases received through the inlet 220 can exit the exhaust assembly 200. A flange 252 is disposed about the outlet 254 for receiving the turbocharger 160 on an end of the turbocharger passage 250. The turbocharger passage 250 is described in further detail below.

The power pack 100 further includes the turbocharger 160 and the muffler 190. The turbocharger 160 is connected to the exhaust assembly 200 at the flange 252 of the turbocharger passage 250. The muffler 190 is fluidly connected to the turbocharger 160 by pipes 192 and 194. A portion of the turbocharger 160 extends leftward from the turbocharger passage 250, as is illustrated in FIG. 2. The pipes 192, 194 extend rightward from the turbocharger passage 250 and the turbocharger 160. The muffler 190 is thus disposed rightward of the turbocharger passage 250. It is contemplated that the turbocharger 160 and the muffler 190 could be disposed in a mirror-image configuration in some implementations, where portions of the turbocharger 160 extend rightward from the turbocharger passage 250 and the muffler 190 is disposed leftward of the turbocharger passage 250.

Figure 4:
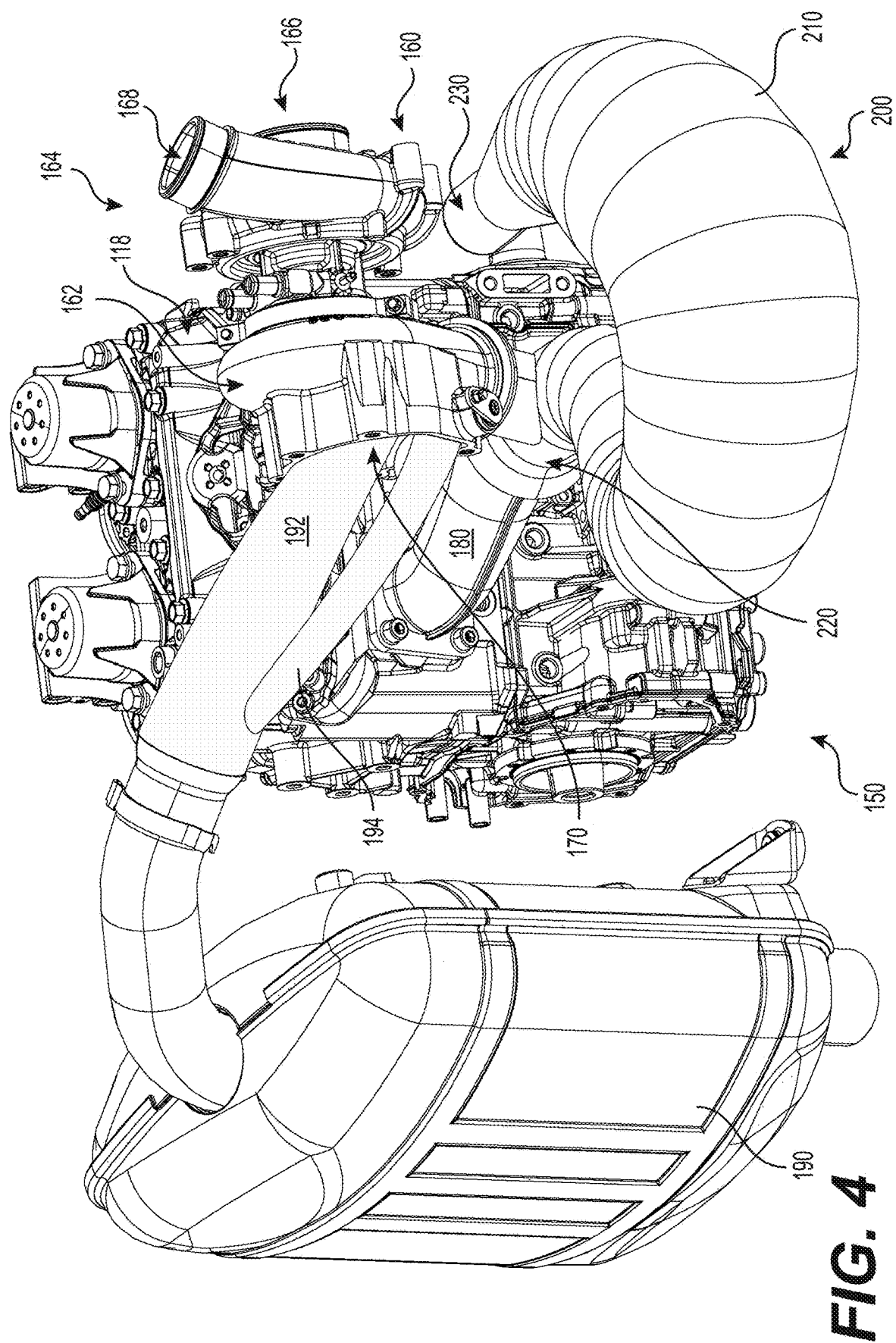
FIG. 4 is a front, right side perspective view of the power pack of FIG. 2.

The turbocharger 160 is fluidly connected to the outlet 254 such that exhaust gases leaving the outlet 254 enter the turbine side 162 of the turbocharger 160. While passing through the turbine side 162, at least a portion of the exhaust gases drive the turbine 172, as described above. The exhaust gases that drive the turbine 172 then exit a turbine side 170 of the turbocharger 160 and pass through the pipe 192 to the muffler 190. A portion of the exhaust gases entering the turbocharger 160 may be diverted instead to a waste gate 174, for example when there is an excess of exhaust gases above what is necessary to drive the turbine 172. The waste gate 174 delivers the excess exhaust gases through the pipe 194, which in turn connects to the pipe 192, as is illustrated in FIGS. 2 to 4.

As is illustrated in FIGS. 6 and 7, the turbocharger passage 250 extends forward and upward away from the inlet 220 from a rear portion of the resonator 210. The inlet 220 and the outlet 254 face partly in opposite directions (rearward and forward, respectively). To better illustrate their respective orientations, axes passing through the outlet 254 and the inlet 220 are depicted in FIGS. 6 and 7. An outlet axis 258 passes through a center 256 of the outlet 254, normal to the outlet 254. An inlet axis 226 passes through a center 224 of the inlet 220, normal to the inlet 220. The outlet axis 258 is disposed at an angle 260 of about 135 degrees to the inlet axis 226, as measured from the center 224 to the center 256. It is contemplated that the angle 260 could be larger or smaller than 135 degrees. For exhaust gases to flow from the inlet 220 out through the outlet 252, the angle 260 would be greater than 90 degrees.

The turbocharger passage 250 is disposed nearer to the inlet 220 than to the closed end 230. Specifically, the turbocharger passage 250 is disposed about a tenth of the length of the center line 202 of the resonator 210 away from the inlet 220, as measured from the inlet 220 toward the closed end 230. It is contemplated that the turbocharger passage 250 could be disposed at less than a third of the length of the center line 202 of the resonator 210 away from the inlet 220. It is also contemplated that the turbocharger passage 250 could be closer or farther from the inlet 220, depending on the implementation.

In the present implementation, the exhaust gases entering through the inlet 220 will generally be directed up through the turbocharger passage 250 by the pressure wave issuing from the resonator 210. This allows the exhaust gases to be directed to the turbocharger 160, rather than propagating through the resonator 210 (as it would for an expansion chamber). If the exhaust gases were directed into an expansion chamber with the turbocharger 160 connected in series thereto, the exhaust gases would heat the expansion chamber. The arrangement of the turbocharger passage 250 near the inlet 220 prevents some of the heating of the resonator 210 and allows the resonator 210 to operate at a cooler temperature than the expansions chamber and turbocharger arrangement described above.

Expansion chambers and resonators must be designed with their operating temperatures taken into consideration in order to provide the right frequency pressure wave to combat air and fuel leakage. Since the wave frequency is directly tied to the speed of sound in air, and the speed of sound in air is temperature dependent, hotter chambers/resonators will generally need to be larger than similar chambers/resonators operating at a lower temperature. By reducing operating temperature for the resonator 210, the overall length as measured along the center line 202 will be reduced compared to the similar expansion chamber described above. Depending on specifics of any given implementation, this can improve the weight and size characteristics of the exhaust assembly 200 compared to a similar expansion chamber and turbocharger series arrangement.

Further, disposing the turbocharger passage 250 nearer to the inlet 220 than to the closed end 230 can help further increase efficiency of the two-stroke engine 110. During operation of the snowmobile 10, exhaust gases will pass through the inlet 220 and out the outlet 252 to the turbocharger 160 at a higher temperature than if the turbocharger passage 250 were disposed farther from the inlet 220 or if the turbocharger 160 were connected in series at the end of an expansion chamber. By disposing the turbocharger passage 250, and thus the turbocharger 160, near to the inlet 220, the exhaust gases have less time and distance over which to cool.

Higher temperature exhaust gases entering the turbocharger 160 generally lead to higher efficiency of the turbocharger 160. The efficiency of the engine 110 can thus be improved by the arrangement of the resonator 210 and the turbocharger 160 brought together by the exhaust assembly 200 over arrangements placing the turbocharger 160 at greater distances from the exhaust manifold 180 or arrangements not including a resonator 210.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An exhaust assembly, comprising:
   a resonator including:
      an inlet adapted for fluidly connecting to an exhaust manifold, the inlet having an inlet axis extending through a center of the inlet and normal to the inlet, and
      a closed end at an end of the resonator opposite the inlet; and
   a turbocharger passage extending from the resonator between the exhaust manifold and the closed end, the turbocharger passage being provided for fluidly connecting the exhaust assembly to a turbocharger such that at least a portion of exhaust gases flowing through the turbocharger passage drives the turbocharger, the turbocharger passage defining an outlet having an outlet axis extending through a center of the outlet and normal to the outlet, the turbocharger passage being disposed nearer to the inlet than to the closed end, and the outlet axis being disposed at an angle to the inlet axis greater than 90 degrees as measured from a center of the outlet to a center of the inlet.

2. The exhaust assembly of claim 1, wherein the turbocharger passage is disposed at less than a third of a length of the resonator from the inlet, the length of the resonator being measured along a center line of the resonator from the inlet to the closed end.

3. The exhaust assembly of claim 1, wherein the resonator is bent in a U-shape such that a central portion of the resonator is farther from the inlet than the closed end is from the inlet.

4. The exhaust assembly of claim 1, wherein a central portion of the resonator has a larger diameter than either of the closed end and the inlet.

5. The exhaust assembly of claim 1, wherein:
   a diameter of the resonator increases as the resonator extends from the inlet toward a central portion of the resonator; and
   the diameter of the resonator decreases as the resonator extends from the central portion toward the closed end.

6. The exhaust assembly of claim 1, further comprising a flange about the outlet adapted for receiving a turbocharger disposed on the turbocharger passage.

7. The exhaust assembly of claim 1, wherein the turbocharger passage extends from the resonator upward and away from the inlet.

8. An exhaust system, comprising:
   an exhaust manifold adapted for connecting to an engine;
   an exhaust assembly operatively connected to the exhaust manifold, the exhaust assembly including:
      a resonator including:
         an inlet connected to the exhaust manifold, the inlet having an inlet axis extending through a center of the inlet and normal to the inlet, and
         a closed end at an end of the resonator opposite the inlet; and
      a turbocharger passage extending from the resonator between the exhaust manifold and the closed end, the turbocharger passage defining an outlet having an outlet axis extending through a center of the outlet and normal to the outlet, the turbocharger passage being disposed nearer to the inlet than to the closed end, and the outlet axis being disposed at an angle to the inlet axis greater than 90 degrees as measured from a center of the outlet to a center of the inlet;

a turbocharger operatively connected to the turbocharger passage and fluidly connected to the outlet; and a muffler fluidly connected to the turbocharger.

9. The exhaust system of claim 8, wherein the turbocharger passage is disposed at less than a third of a length of the resonator from the inlet, the length of the resonator being measured along a center line of the resonator from the inlet to the closed end.

10. The exhaust system of claim 8, wherein the resonator is bent in a U-shape such that a central portion of the resonator is farther from the inlet than the closed end is from the inlet.

11. The exhaust system of claim 8, wherein a central portion of the resonator has a larger diameter than either of the closed end and the inlet.

12. The exhaust system of claim 8, wherein the turbocharger passage extends from the resonator upward and away from the inlet.

13. A power pack comprising:
an engine; and
an exhaust system operatively connected to the engine, the exhaust system comprising:
 an exhaust manifold connected to the engine;
 an exhaust assembly operatively connected to the exhaust manifold, the exhaust assembly including:
  a resonator including:
   an inlet connected to the exhaust manifold, the inlet having an inlet axis extending through a center of the inlet and normal to the inlet, and
   a closed end at an end of the resonator opposite the inlet; and
  a turbocharger passage extending from the resonator between the exhaust manifold and the closed end, the turbocharger passage defining an outlet having an outlet axis extending through a center of the outlet and normal to the outlet, the turbocharger passage being disposed nearer to the inlet than to the closed end, and the outlet axis being disposed at an angle to the inlet axis greater than 90 degrees as measured from a center of the outlet to a center of the inlet;
 a turbocharger operatively connected to the turbocharger passage and fluidly connected to the outlet; and
 a muffler fluidly connected to the turbocharger.

14. A vehicle comprising:
a frame;
at least one of an endless drive track, a ski and a wheel operatively connected to the frame;
the power pack of claim 13, the engine being connected to the frame and being operatively connected to the at least one ground engaging member; and
at least one seat connected to the frame.

15. The vehicle of claim 14, wherein:
the resonator extends forward, to one of leftward and rightward, and then rearward from the manifold;
the turbocharger passage extends upward and forward from a rear portion of the resonator;
at least a portion of the turbocharger extends one of rightward and leftward of the turbocharger passage; and
the muffler is disposed at an other one of rightward and leftward of the turbocharger passage.

16. The power pack of claim 13, wherein the turbocharger passage extends from the resonator upward and away from the inlet.

* * * * *